May 19, 1931.  T. WILSON  1,805,609

LUBRICATING SYSTEM

Filed March 30, 1929

INVENTOR

Patented May 19, 1931

1,805,609

UNITED STATES PATENT OFFICE

TOM WILSON, OF HOMESTEAD, PENNSYLVANIA

LUBRICATING SYSTEM

Application filed March 30, 1929. Serial No. 351,160.

This invention relates generally to lubricating systems, and more particularly to such systems wherein a definite predetermined amount of lubricant is supplied to a bearing or other part to be lubricated, irrespective of the time the control valve is open, and irrespective of the viscosity of the lubricant.

In automatic lubricating systems heretofore in use it has been customary to control the amount of lubricant supplied to the bearing by maintaining the valve in the lubricant supply line open for a definite period of time. In such lubricating systems the amount of lubricant supplied to the bearing is dependent upon its viscosity. For example, if the time that the valve in the supply line is open is maintained constant, and the viscosity of the lubricant is decreased due either to changes in temperature or to a substitution of lubricants, the lubricant flows more freely and in the same time interval a greater quantity is supplied to the bearing than if the viscosity of the lubricant were not decreased. Such systems often involve complicated timing mechanism.

My invention provides a lubricating system in which a definite, measured quantity of lubricant is supplied to the bearing irrespective of changes in viscosity of the lubricant, and irrespective of the time during which the valve in the lubricant supply line is maintained open.

According to one form of the invention, a definite predetermined quantity of lubricant is supplied to a bearing by arranging a cylinder and piston between the valve controlling the lubricant supply, and the bearing. The ends of the cylinder communicate with the ports in the valve. The lubricant exerts pressure on one side of the piston to force the lubricant on the opposite side of the piston to the bearing. The position of the valve is then reversed and lubricant is discharged from the opposite end of the cylinder. In this manner the amount of lubricant discharged is dependent upon the size of the cylinder and the stroke of the piston, and is not dependent upon the length of time the control valve is open, or on the viscosity of the lubricant.

Figure 1:
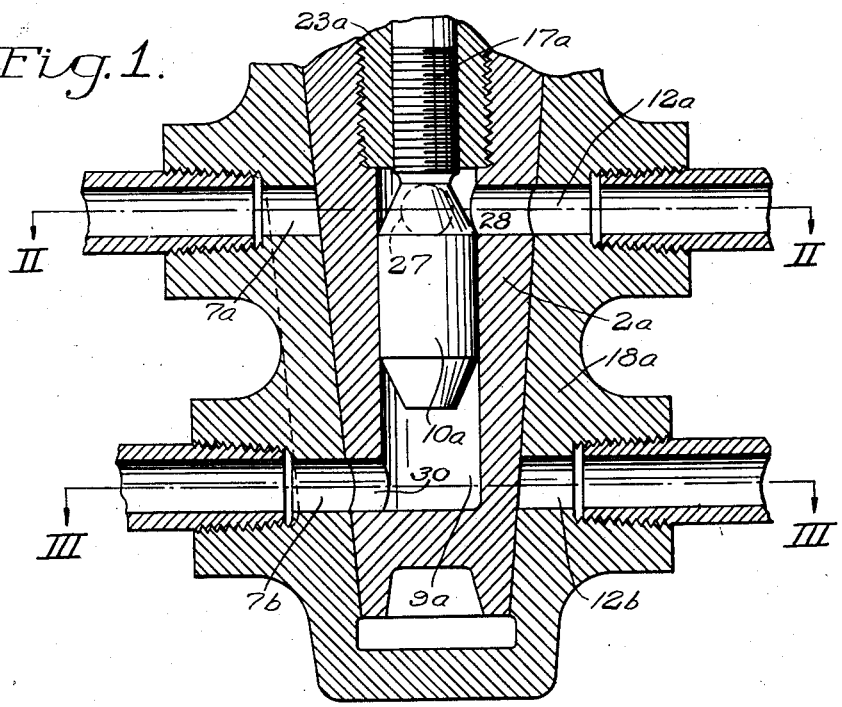
Figure 2:
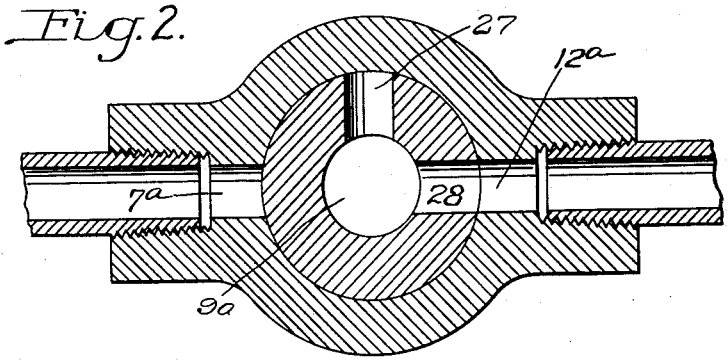
Figure 3:
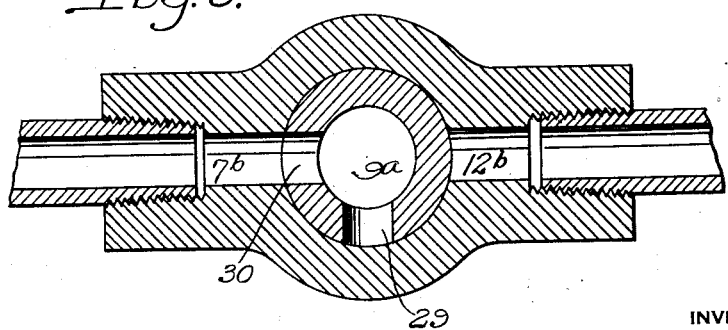

In the accompanying drawings which illustrate the present preferred embodiment of my invention Figure 1 is a sectional view through a valve mechanism for controlling the supply of lubricant, the piston being shown in elevation;

Figure 2 is a section on the line II—II of Figure 1, the piston being omitted, and Figure 3 is a section on the line III—III of Figure 1, the piston also being omitted in this figure.

Referring more particularly to the drawings, there is shown a valve casing $18a$ having lubricant passages $7a$ and $7b$ adjacent the ends of the casing. These passages communicate with a source of lubricant under pressure. On the opposite side the casing is provided with lubricant passages $12a$ and $12b$ which communicate with the parts to be lubricated. A valve plug $2a$ is arranged within the casing $18a$. The valve plug is formed hollow so as to provide a cylinder $9a$. A piston $10a$ is adapted to reciprocate within the cylinder. The valve plug $2a$ has lubricant passages 27 and 28 connecting the cylinder $9a$ with the passages $7a$ and $12a$. Passages 29 and 30 which are similar to 27 and 28 are provided in the valve plug $2a$ adjacent its lower end. The passages 29 and 30 likewise connect the cylinder $9a$ with the passages $7b$ and $12b$. An adjusting screw $17a$ is screwed into a head $23a$ in order to limit the stroke of the piston $10a$.

In the operation of the lubricating system, lubricant under pressure flows through the passage $7b$ and passage 30 into the lower end of the cylinder $9a$. This raises the piston $10a$ in the cylinder and forces out lubricant from the upper end of the cylinder through the passages 28 and $12a$. The valve is then rotated through 90°. In this position lubricant under pressure flows through the passages $7a$ and 27 into the upper end of the cylinder $9a$. This forces the piston downwardly expelling lubricant from the lower end of the cylinder $9a$ through the passages 29 and $12b$ to another part to be lubricated.

It will be seen that the modified lubricating system is adapted to supply lubricant alternately to a plurality of parts to be lubricated. Movement of the piston within the cylinder causes lubricant to flow to one of the parts, and movement of the piston in the opposite direction causes lubricant to flow to the other part. The amount of lubricant is definitely controlled irrespective of the time the control valve remains open and irrespective of the viscosity of the lubricant.

I have illustrated and described two present preferred embodiments of my invention. It is to be understood, however, that the invention may be otherwise modified without departing from the spirit of the invention or the scope of the following claim.

I claim:

A device for use in a lubricating system in order to supply a predetermined amount of lubricant, said device comprising a valve casing provided with two inlets and two outlets, a valve having an axially extending cylinder containing a piston, said valve being provided with passageways to supply lubricant from one inlet through a passageway in the valve to the cylinder, the outlet opposite thereto and the other inlet being closed, the incoming lubricant moving the piston to the opposite end of the cylinder and forcing a measured charge through the outlet opposite the closed inlet, and upon turning the valve the second inlet is opened and the first closed, the first outlet closed and the second opened, the piston being moved to the opposite end of the cylinder.

In testimony whereof I have hereunto set my hand.

TOM WILSON.